Patented Dec. 1, 1936

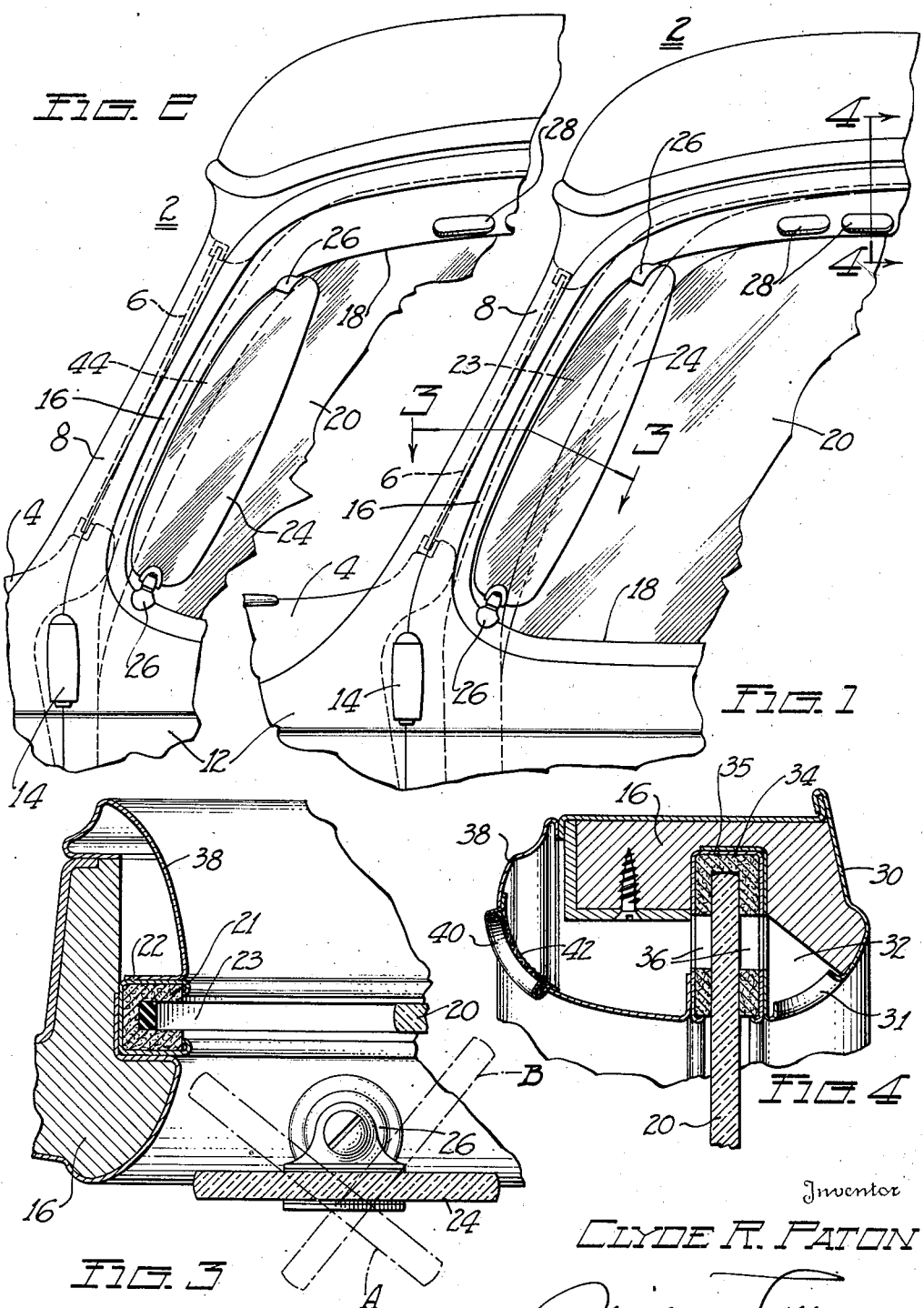

2,062,475

UNITED STATES PATENT OFFICE 2,062,475

MOTOR VEHICLE

Clyde R. Paton, Birmingham, Mich., assignor to Packard Motor Car Company, Detroit, Mich., a corporation of Michigan Application June 7, 1934, Serial No. 729,375

5 Claims. (Cl. 296—44)

This invention relates to motor vehicle of the closed type and more particularly to windows and associated parts for producing a circulation of air through the window openings.

Certain window constructions for motor vehicles have recently been devised in which a window is movable to provide a relatively narrow opening between the forward side edge of the window and the window frame. The invention is particularly intended to be embodied in a motor vehicle having such a window construction. Certain features of the invention, however, are not limited to such a construction.

One object of the present invention is to improve the construction and mode of operation of windows and associated parts for motor vehicles with the view of improving the ventilation of such vehicles.

Another object of the invention is to provide motor vehicles with a novel construction and arrangement of window and air deflector which will produce certain improved results in the ventilation of the interior of the body of a motor vehicle.

A still further object of the invention is to produce an improved construction and arrangement of window and air deflector for motor vehicles whereby a relatively narrow opening extending along the front edge of a window may be produced and the outside air may be deflected into said opening or the air within the vehicle may be withdrawn through said opening.

With the above and other objects in view the invention consists in a construction embodying the novel and improved features hereinafter described and particularly pointed out in the claims, the advantages of which will be readily understood by those skilled in the art.

The invention will be clearly understood from the accompanying drawing illustrating constructions embodying the invention and the following detailed description of the constructions therein shown.

In the drawing Fig. 1 is a view in side elevation illustrating a portion of a motor vehicle embodying the invention in its preferred form;

Fig. 2 is a view similar to Fig. 1 illustrating a different construction embodying the invention;

Fig. 3 is a detail sectional view taken substantially on the line 3—3 of Fig. 1; and Fig. 4 is a detail sectional view taken substantially on the line 4—4 of Fig. 1 and showing the window in fully raised position.

The invention is illustrated in the drawing as applied to an automobile body indicated as a whole at 2, having a cowl 4, an inclined windshield 6 mounted between side pillars 8 and a door 12 pivoted upon hinges one of which is shown at 14.

The upper portion of the door is provided with a window frame indicated at 16, in which is formed a window opening 18.

In the construction shown in Figs. 1, 3 and 4, the door is provided with a window 20 consisting of a transparent panel preferably made of glass, having an inclined forward edge and mounted for horizontal sliding movement and for vertical sliding movement in suitable guides attached to the door frame. The side margins of the window 20 move in guides formed by channel strips 21 mounted in channels 22 secured in the window frame. In moving the window 20 from closed to fully opened position the window is first moved horizontally to the right substantially into the position shown in dot-and-dash lines in Fig. 1 and then is moved vertically downwardly. The movement of the window horizontally from closed position to the position shown in dot-and-dash lines in Fig. 1 forms a relatively long narrow opening 23 between the forward edge of the window and the window frame. The downward movement of the window from the position shown in dot-and-dash lines to the position shown in full lines in said figure, widens said opening because of the angular relation of the forward edge of the window to the direction of movement. Any suitable mechanism may be provided for supporting the window for horizontal and vertical movements and for imparting these movements to the window. For example, the window may be supported and actuated by mechanism substantially the same as that shown and described in the co-pending application of Milton Tibbetts, Ser. No. 721,415 filed April 20, 1934, for supporting and actuating the forward window section.

The construction shown in Fig. 1 comprises an air deflector indicated at 24 arranged some distance outside the plane of the window to extend adjacent the opening between the forward edge of the window and the window frame and longitudinally of said opening for deflecting the outside air with relation to said opening. This deflector is pivoted to the window frame upon trunnions 26 to turn about an axis located outside the plane of the window intermediate between the edges of the deflector and extending longitudinally of the adjacent edges of the window and window frame and also longitudinally of the opening 23. The location of the deflector in the position shown outside the plane of the window places the same, when adjusted in angular positions with relation to the window, in the path of the air currents passing the pillar 8 and the forward part of the window frame. The deflector preferably is arranged to overlap the forward margin of the window when the window is adjusted in positions such as shown in Figs. 1 and 3.

The deflector 24 thus is pivoted for adjustment angularly in a large number of different positions with relation to the window 20. Fig. 3 shows three of the positions in which the deflector may be adjusted. The deflector thus may be adjusted in a position substantially parallel to the window 20 as shown in full lines in Fig. 3 in which position it has very little, if any, deflecting action on the air currents passing the window during the movement of the vehicle. When the window is adjusted to provide an opening between the forward edge thereof and the window frame and it is desired to draw the air from the inside of the vehicle through this opening, the deflector is adjusted in an angular position extending outwardly away from the window from the front toward the rear of the deflector as shown in dot-and-dash lines in Fig. 3, and indicated at A. When the deflector is in such a position, the air currents passing rearwardly along the forward portion of the window frame will be deflected outwardly, and by the ejector action, air will be drawn outwardly through the opening in the window. When it is desired to deflect the outside air into the window opening the deflector is adjusted in an angular position extending toward the window from the front toward the rear of the deflector as shown in dot-and-dash lines in Fig. 3, and indicated at B. With the deflector in such a position the air currents passing rearwardly along the forward portion of the window frame will be caught by the deflector and deflected inwardly through the window opening. The deflecting effect of the deflector, both in drawing the air out of the window opening and in deflecting the outside air into the window opening, may be varied by different angular adjustments of the deflector.

The window frame portion of the door is provided with a series of openings or passages through which air may be drawn into the vehicle and out of which air may be discharged from the vehicle respectively as air is drawn from the vehicle or projected into the vehicle through the opening 23. These passages are closed by the window when the window is closed and are opened by the opening movement of the window. As shown in Fig. 1, these passages are indicated generally at 28 and are formed in the portion of the window frame above the window opening. As shown in Fig. 4, the window frame is provided with a sheathing of sheet metal indicated at 30 in which is formed a series of slots 31 and the interior of the frame is cut away to form air passages 32. The upper margin of the window is received between the sides of a relatively deep channel strip 34 held in a channel 35 secured in the upper part of the window frame, and the channel and channel strip are provided with slots 36 registering with the passages 32. On the inside of the window frame is secured a moulding of sheet metal 38 formed with slots 40 preferably registering with the openings 36, and each having a screen 42 covering the same.

With the above construction it will be noted that when the window is closed the passages 28 are closed by the upper margin of the window. Also, when the window has been moved laterally or horizontally into the position shown in dot-and-dash lines in Fig 1, the openings 36 are still closed by the window. However, when the window is lowered into the position shown in full lines in Fig. 1, the passages are opened permitting the free passage of air. Thus when the deflector 24 is in the position A, shown in Fig. 3, to draw air from the interior of the vehicle, air may pass into the vehicle through the passages 28. Also, when the deflector 24 is in the position indicated at B, Fig. 3, to deflect air into the vehicle, air may pass from the vehicle through said passages. The amount of air passing through the passages may be regulated by varying the vertical adjustment of the window.

The construction shown in Fig. 2 is similar to that shown in Fig. 1 except that the window has no horizontal movement, but is movable in a vertical direction only between fully closed and fully opened positions. In said construction, when the window is moved downwardly from closed position into the position shown in Fig. 1, a relatively narrow opening 44 is formed between the forward edge of the window and the window frame because of the angular relation of the forward edge of the window to the direction of movement. When the window is fully raised, the passages 28 are closed by the upper portion of the window. When the window is lowered into the position shown in Fig. 2, the said passages are opened so that air may pass into or out of the vehicle through these passages.

With the above constructions the window may be tightly closed, when desired, to prevent the driving of rain or the entrance of cold air into the inside of the vehicle. By adjusting the window to provide a ventilating opening between the forward side edge thereof and the frame and adjusting the deflector 24, the vehicle may be effectively ventilated, and the flow of air through said opening may be fully controlled. The width of the ventilating opening may be adjusted to regulate the air currents passing through the opening by the adjustment of the window. When the deflector is adjusted in the position A, shown in Fig. 3, the air will be withdrawn from the vehicle to ventilate the same and the deflector will efficiently prevent the entrance of rain into the vehicle.

It will be noted that the slots 31 in the sheathing 30 are some distance below the slots 36 and are directed downwardly. This prevents rain from driving through the passages 28 into the inside of the body when the passages are opened.

It is to be understood that the invention is not limited to the particular construction and arrangement of parts of the illustrated embodiment of the invention but that the construction shown and described is merely illustrative of the invention and that the invention may be embodied in other forms within the scope of the claims.

Having explained the nature and object of the invention and having specifically described a construction embodying the invention in its preferred form, what is claimed is:

1. A construction for motor vehicles comprising a window frame, a window movable into position to provide a relatively narrow opening between a side edge of the window and the window frame, and a movable deflector having two or more operative positions, and arranged when in one position, to deflect the outside air into said opening and, when in another position, to deflect said air away from said opening, the window frame having a passage for the entrance or discharge of air.

2. A construction for motor vehicles comprising a window frame, a window movable into position to provide a relatively narrow opening between a side edge of the window and the window frame, and an angularly movable air deflector arranged to be located either in position to deflect the outside air into said opening or in position to deflect said air away from said opening, the window frame having a passage above the window opening, closed and opened by the vertical movement of the window for the entrance or discharge of air.

3. A construction for motor vehicles comprising in combination, a window frame having a window opening therein, and means for closing the opening entirely or bringing about inflow or outflow of air for ventilating purposes under the close control of the vehicle operator, said means including a window movable in the plane of the frame into position to close the opening or into position to provide an elongated aperture between a side edge of the window and the adjacent side of the window frame, and an air deflector positioned without the window for directing the outside air relatively to the said aperture, the window being adjustable to bring its side edge into any one of a plurality of positions relatively to the window frame side to provide elongated apertures of various widths, and the deflector being movable at will to bring its leading edge close to the plane of the window and in advance of the side edge thereof or its following edge close to the plane of the window and closely adjacent the side edge thereof, whereby the operator may bring about a movement of air in either direction of flow, through said aperture, and in the desired volume.

4. A construction for motor vehicles comprising in combination, a window frame having a window opening therein, and means for closing the opening entirely or bringing about inflow or outflow of air for ventilating purposes under the close control of the vehicle operator, said means including a window movable in the plane of the frame into position to close the opening or into position to provide an elongated aperture between a side edge of the window and the adjacent side of the window frame, and a deflector positioned without the window for directing the outside air relatively to the said aperture, said deflector being substantially flat, relatively narrow, and approximately as long as any elongated aperture defined by the window side edge and the window frame, the window being adjustable to bring its side edge into any one of a plurality of positions relatively to the window frame side to provide elongated apertures of various widths, and the deflector being movable at will to bring its leading edge close to the plane of the window and in advance of the side edge thereof or its following edge close to the plane of the window and closely adjacent the side edge thereof, whereby the operator may bring about a movement of air in either direction of flow, through said aperture, and in the desired volume.

5. A construction for motor vehicles comprising in combination, a window frame having a window opening therein, and means for closing the opening entirely or bringing about inflow or outflow of air for ventilating purposes under the close control of the vehicle operator, said means including a window movable in the plane of the frame into position to close the opening or into position to provide an elongated aperture between a side edge of the window and the adjacent side of the window frame, and an air deflector positioned without the window for directing the outside air relatively to the said aperture, said deflector being relatively long and narrow and mounted for swinging movement about an axis which extends generally parallel to the aperture-defining window side edge, the window being adjustable to bring its side edge into any one of a plurality of positions relatively to the window frame side to provide elongated apertures of various widths, and the deflector being movable at will to bring its leading edge close to the plane of the window and in advance of the side edge thereof or its following edge close to the plane of the window and closely adjacent the side edge thereof, whereby the operator may bring about a movement of air in either direction of flow, through said aperture, and in the desired volume.

CLYDE R. PATON.